US012521055B2

(12) United States Patent
Pederson et al.

(10) Patent No.: US 12,521,055 B2
(45) Date of Patent: Jan. 13, 2026

(54) AMPLIFIER INTERFACE FOR MULTI-ELECTRODE CATHETER

(71) Applicant: St. Jude Medical, Cardiology Division, Inc., St. Paul, MN (US)

(72) Inventors: Brian Pederson, Selma, TX (US); Greg Olson, Elk River, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 450 days.

(21) Appl. No.: 17/921,479

(22) PCT Filed: Apr. 12, 2021

(86) PCT No.: PCT/US2021/026871
§ 371 (c)(1),
(2) Date: Oct. 26, 2022

(87) PCT Pub. No.: WO2021/221892
PCT Pub. Date: Nov. 4, 2021

(65) Prior Publication Data
US 2023/0181081 A1 Jun. 15, 2023

Related U.S. Application Data

(60) Provisional application No. 63/017,426, filed on Apr. 29, 2020.

(51) Int. Cl.
*A61B 5/304* (2021.01)
*A61B 5/00* (2006.01)
(Continued)

(52) U.S. Cl.
CPC .............. *A61B 5/304* (2021.01); *A61B 5/287* (2021.01); *A61B 5/308* (2021.01); *A61B 5/318* (2021.01);
(Continued)

(58) Field of Classification Search
None
See application file for complete search history.

(56) References Cited

U.S. PATENT DOCUMENTS 7,263,397 B2    8/2007  Hauck
9,289,606 B2    3/2016  Paul
(Continued)

FOREIGN PATENT DOCUMENTS

WO    2018208795 A1    11/2018

OTHER PUBLICATIONS

International Search Report and Written Opinion issued in International Patent Application No. PCT/US2021/026871, mailed Jul. 20, 2021, 14 pages.

*Primary Examiner* — Michael W Kahelin
(74) *Attorney, Agent, or Firm* — Billion & Armitage

(57) ABSTRACT

Disclosed herein is a multi-electrode catheter system including an amplifier stage and an amplifier interface. The amplifier stage includes at least a first quantity of amplifier channels. The amplifier interface includes a first interface having at least the first quantity of interface channels. The amplifier channels are respectively electrically coupled to the interface channels The amplifier interface includes a second interface having a second quantity of catheter channels, the second quantity being greater than the first quantity. The catheter channels are configured to be respectively electrically coupled to corresponding electrode leads of a multi-electrode catheter. The amplifier interface includes a switching matrix electrically coupled between the first interface and the second interface. The switching matrix is configured to selectively electrically couple a selected subset of catheter channels to respective interface channels of the first quantity of interface channels.

20 Claims, 7 Drawing Sheets

(51) Int. Cl.
*A61B 5/287* (2021.01)
*A61B 5/308* (2021.01)
*A61B 5/318* (2021.01)
*A61B 18/00* (2006.01)
*A61B 18/10* (2006.01)
*A61B 18/12* (2006.01)

(52) U.S. Cl.
CPC .......... *A61B 5/6852* (2013.01); *A61B 5/6886* (2013.01); *A61B 18/10* (2013.01); *A61B 18/1206* (2013.01); *A61B 5/6857* (2013.01); *A61B 5/6858* (2013.01); *A61B 2018/00178* (2013.01); *A61B 2018/124* (2013.01)

(56) References Cited

U.S. PATENT DOCUMENTS

| | | |
|---|---|---|
| 10,136,829 B2 | 11/2018 | Deno |
| 10,252,069 B1 * | 4/2019 | Kroll .................. A61N 1/08 |
| 2006/0058588 A1 * | 3/2006 | Zdeblick ............... A61N 1/056 |
| | | 600/300 |
| 2014/0276151 A1 * | 9/2014 | Xi ........................ A61B 5/316 |
| | | 600/508 |
| 2018/0014751 A1 | 1/2018 | Hill |
| 2018/0042674 A1 * | 2/2018 | Mickelsen ......... A61B 18/1492 |
| 2019/0201688 A1 | 7/2019 | Olson |
| 2019/0209238 A1 * | 7/2019 | Jimenez ............ A61B 18/1492 |
| 2019/0387988 A1 * | 12/2019 | Warner .................. A61B 5/308 |
| 2020/0008705 A1 * | 1/2020 | Ziv-Ari ................ A61B 5/304 |
| 2020/0101279 A1 * | 4/2020 | Drake ................ A61N 1/37205 |
| 2022/0226041 A1 | 7/2022 | Dale |
| 2022/0304745 A1 | 9/2022 | Olson |

* cited by examiner

AMPLIFIER INTERFACE FOR MULTI-ELECTRODE CATHETER

CROSS-REFERENCE TO RELATED APPLICATIONS

This application claims priority to U.S. provisional application Ser. No. 63/017,426, filed Apr. 29, 2020, which is incorporated herein by reference in its entirety.

FIELD

The present disclosure relates generally to medical devices that are used in the human body. In particular, the present disclosure relates to an amplifier interface for multi-electrode catheters, such as those used in certain sensing, mapping, and diagnostic systems.

BACKGROUND

Multi-electrode catheters are commonly used in sensing, mapping, and diagnostic systems to conduct electrophysiology studies, for example, to identify arrhythmias, map anatomical structures, and navigate the multi-electrode catheter, or other catheters, within the human anatomy in realtime. For example, a measurement system, or mapping system, introduces an electric field into the anatomy through the multi-electrode catheter. Blood and tissue within the anatomy and subject to the electric field modify that electric field in a manner that can be measured by one or more electrodes of the multi-electrode catheter. Electrodes may also measure, for example, electrical activity of the heart itself. These various electrical measurements can be transformed into geometric measurements that enable the mapping of anatomical structures and the locating of one or more catheters within the anatomy. Generally, the quantity of electrodes and the density of those electrodes on the electrode assembly of the catheter dictate the resolution of geometric measurements that can be achieved with a given multi-electrode catheter. More specifically, a greater quantity and greater density of electrodes can yield a greater resolution mapping of the anatomical structure.

Multi-electrode catheters are also used in treating various conditions afflicting the human anatomy. Cardiac arrhythmias, for example are sometimes treated using ablation therapy, which utilizes a multi-electrode catheter. When tissue is ablated, or at least subjected to ablative energy generated by an ablation generator and delivered by an ablation catheter, lesions form in the tissue. Electrodes mounted on or in ablation catheters are used to create tissue necrosis in cardiac tissue to correct conditions such as atrial arrhythmia (including, but not limited to, ectopic atrial tachycardia, atrial fibrillation, and atrial flutter). Arrhythmia (i.e., irregular heart rhythm) can create a variety of dangerous conditions including loss of synchronous atrioventricular contractions and stasis of blood flow that can lead to a variety of ailments and even death. It is believed the primary cause of atrial arrhythmia is stray electrical signals within the left or right atrium of the heart. The ablation catheter imparts ablative energy to cardiac tissue to create a lesion in the cardiac tissue. This lesion disrupts undesirable electrical pathways and thereby limits or prevents stray electrical signals that lead to arrhythmias.

SUMMARY OF THE DISCLOSURE

The present disclosure is directed to a multi-electrode catheter system including a catheter, a plurality of electrodes coupled to the catheter at a distal end thereof, and an amplifier coupled in communication with the plurality of electrodes through an amplifier interface.

The present disclosure is further directed to a multi-electrode catheter system. The multi-electrode catheter system includes an amplifier stage, and an amplifier interface. The amplifier stage includes at least a first quantity of amplifier channels. The amplifier interface includes a first interface having at least the first quantity of interface channels. The amplifier channels are respectively electrically coupled to the interface channels. The amplifier interface includes a second interface having a second quantity of catheter channels, the second quantity being greater than the first quantity. The catheter channels are configured to be respectively electrically coupled to corresponding electrode leads of a multi-electrode catheter. The amplifier interface includes a switching matrix electrically coupled between the first interface and the second interface. The switching matrix is configured to selectively electrically couple a selected subset of catheter channels to respective interface channels of the first quantity of interface channels.

The present disclosure is further directed to an amplifier interface for a multi-electrode catheter. The amplifier interface includes a first interface, a second interface, and a switching matrix. The first interface includes at least a first quantity of interface channels configured to be electrically coupled to corresponding amplifier channels. The second interface includes a second quantity of catheter channels, the second quantity being greater than the first quantity. The catheter channels are configured to be respectively electrically coupled to corresponding electrode leads of a multi-electrode catheter. The switching matrix is electrically coupled between the first interface and the second interface. The switching matrix is configured to selectively electrically couple a selected subset of catheter channels to respective interface channels of the first quantity of interface channels.

The present disclosure is further directed to a method of coupling an amplifier stage to a multi-electrode catheter. The method includes receiving a selection of a subset of catheter channels of the multi-electrode catheter. The method includes mapping the subset of catheter channels to a first quantity of respective interface channels. The method includes operating a switching matrix based on the mapping to electrically couple the selected subset of catheter channels, from a second quantity of catheter channels, the second quantity being greater than the first quantity, to the respective interface channels.

BRIEF DESCRIPTION OF THE DRAWINGS

Corresponding reference characters indicate corresponding parts throughout the several views of the drawings. The drawings are not necessarily to scale.

DETAILED DESCRIPTION OF THE DISCLOSURE

Figure 1:
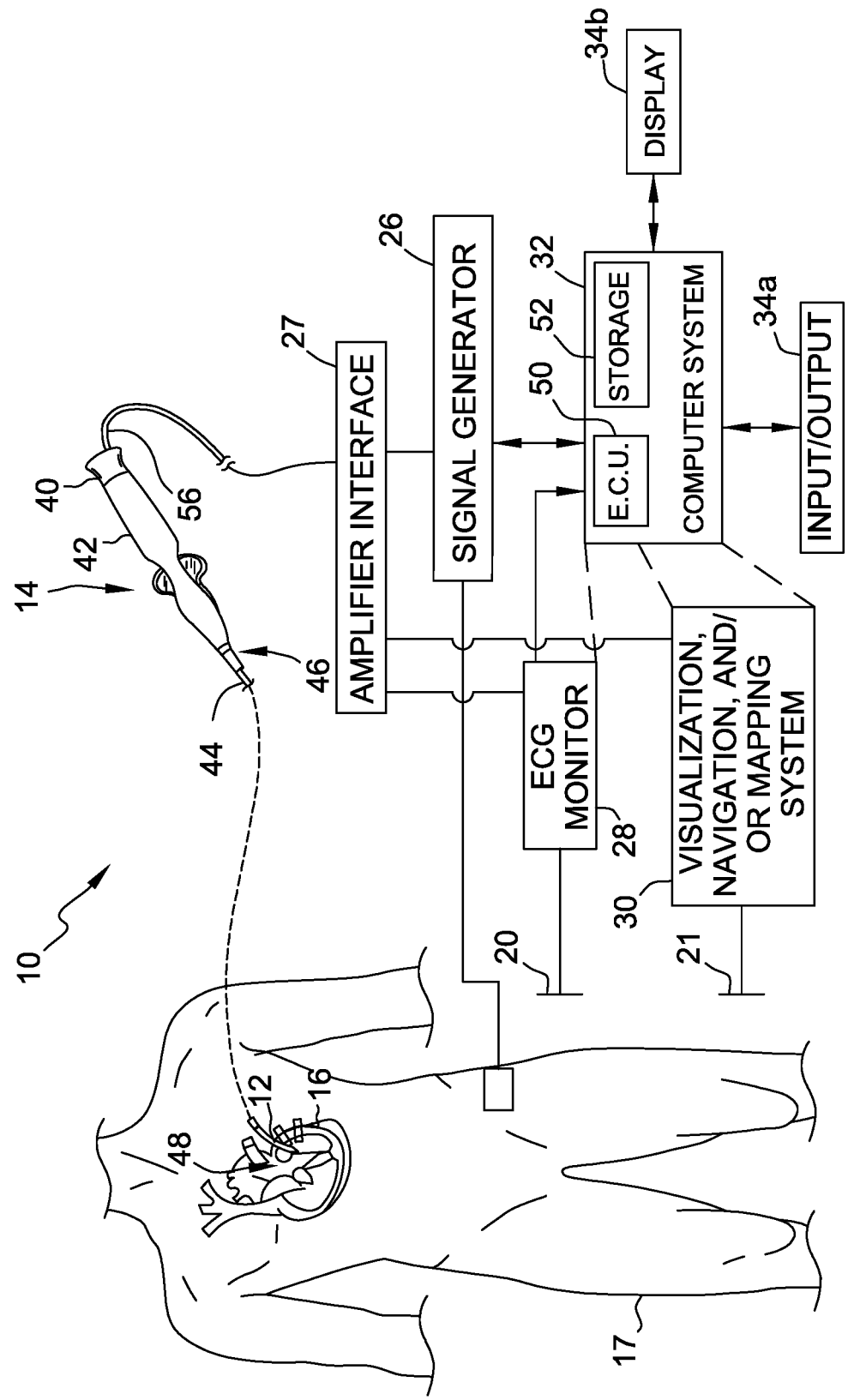
FIG. 1 is a schematic and block diagram view of an example multi-electrode catheter system.

The present disclosure relates generally to medical devices for use in the human body. In particular, in many embodiments, the present disclosure relates to a multi-electrode catheter system including an amplifier interface for electrically connecting the numerous electrodes of the catheter to a limited number of channels of an amplifier stage of a signal generator for the multi-electrode catheter system. A typical facility, for example, for carrying out sensing, mapping, or diagnostics, or ablation therapy, utilizes a signal generator having an amplifier, amplifier stage, or amplifier system, and having a limited quantity of channels for driving various electrodes, for monitoring, navigating, visualizing, and for ablation therapy. Such signal generators may be so limited that a multi-electrode catheter may include an order of magnitude greater number of electrodes than there are channels available on the amplifier. For example, a catheter having 256 electrodes may be desired for an electrophysiology study and ablation therapy, but the signal generator may be limited to 128 or 64 amplifier channels. Consequently, only a fraction of those channels may be available for the multi-electrode catheter for sensing, mapping, diagnostics, or for ablation, or any combination.

The multi-electrode catheter systems described in the present disclosure include an amplifier interface having a switching matrix for selectively coupling a portion of the electrodes on the multi-electrode catheter to respective channels of the signal generator. The amplifier interface selects which electrodes to enable based on, for example, operator input, tissue contact, catheter position, or electrogram measurements. For example, an operator may select a quadrant or hemisphere, or other sub-grouping of electrodes to enable. The operator may make such a selection through a user interface that may be implemented locally on the amplifier interface, remotely on another user device, or may be integrated with a signal generator or other computing system. Alternatively, for example, the amplifier interface may enable only electrodes that detect tissue contact. In such embodiments, the amplifier interface may incorporate an impedance-based contact detection system in which a high-frequency signal is transmitted to each electrode, and impedance, and therefore tissue contact, is determined based on detected reflections. Alternatively, for example, the amplifier interface may select electrodes producing a certain threshold electrogram measurement, e.g., voltage amplitude above 0.5 mV or above 1.0 mV. The amplifier interface allocates and connects selected electrodes to respective channels of the signal generator based on, for example, an allocation algorithm or a look-up table.

It is contemplated, however, that the described features and methods of the present disclosure as described herein may be incorporated into any number of systems as would be appreciated by one of ordinary skill in the art based on the disclosure herein.

Referring now to the drawings, FIG. 1 illustrates an exemplary embodiment of a system 10 for electrophysiology studies, e.g., mapping, or ablation therapy. In general, the various embodiments include an electrode assembly disposed at the distal end of a catheter. As used herein, "proximal" refers to a direction toward the end of the catheter near the clinician and "distal" refers to a direction away from the clinician and (generally) inside the body of a patient. The electrode assembly includes one or more individual, electrically-isolated electrode elements. In some embodiments, each electrode element, also referred to herein as a catheter electrode, is individually wired such that it can be selectively paired or combined with any other electrode element to act as a bipolar or a multi-polar electrode.

System 10 includes a catheter electrode assembly 12 including a plurality of catheter electrodes configured to be used as briefly outlined above and as described in greater detail below. Electrode assembly 12 is incorporated as part of a multi-electrode catheter 14 used for sensing, mapping, and diagnostics to conduct electrophysiology studies to identify and treat, for example, arrhythmias. System 10 introduces a modulated electric field into tissue 16 in a body of a patient 17. In the illustrative embodiment, tissue 16 comprises heart or cardiac tissue. It should be understood, however, that embodiments may be used to map, diagnose, or treat a variety of other body tissues. The blood volume and the moving heart wall surface modify the electric field in a manner that can be detected by multi-electrode catheter 14 and, more specifically, electrodes of electrode assembly 12. The electrodes within the heart chamber monitor the modifications to the applied electric field, and the resulting electrical signals enable production of a dynamic representation, e.g., for display to a physician, of the location of the walls of the heart. The electrodes on electrode assembly 12 also detects electrical signals generated by the heart itself. The detected electrical signals can then be displayed, e.g., as an electrocardiogram.

System 10, in mapping heart or cardiac tissue, may also be used to locate and navigate a therapy catheter in the heart chamber. In such an embodiment, an electrode on the therapy catheter, which may be incorporated with multi-electrode catheter 14 and electrode assembly 12, or independent, introduces an electric field that can be detected by electrodes on electrode assembly 12. The detected electrical signals enable locating the therapy catheter within the heart. The location of the therapy catheter can be conducted concurrently with mapping and diagnostics using multi-electrode catheter 14. In certain embodiments, electrodes on electrode assembly 12 are allocated among the various functions. Accordingly, embodiments of electrode assembly 12 having more numerous electrodes are desired, to enable greater resolution of sensing, mapping, and diagnostic functions.

System 10 may also be used for ablation therapy to form lesions on target tissue 16. For example, system 10 may be used for high-frequency ablation therapy, for electroporation-induced primary necrosis therapy, or any other form of ablation therapy. Typically, high-frequency ablation therapy utilizes electric current in the form of a high-frequency alternating current (AC) signal delivered by multiple electrodes on electrode assembly 12. Electroporation therapy is a non-thermal ablation technique that typically utilizes electric current delivered as a pulsed electric field in the form of short-duration direct current (DC) pulses between closely spaced electrodes on electrode assembly 12. Pulse widths of these DC signals may be on the order of one nanosecond to several milliseconds, and the DC pulses may be repeated to form a pulse train. When a strong electric field is applied to tissue in vivo, the cells in the tissue are subjected to a trans-membrane potential that opens the pores on the cell wall, hence the term electroporation. Electroporation may be reversible (i.e., the temporally-opened pores will reseal) or irreversible (i.e., the pores will remain open). For example, in the field of gene therapy, reversible electroporation (i.e., temporarily open pores) is used to transfect high molecular weight therapeutic vectors into the cells. In other therapeutic applications, a suitably configured pulse train alone may be used to cause cell destruction, for instance by causing irreversible electroporation (IRE).

It should be understood that while the energization strategies for ablation are described as involving AC and/or DC waveforms, embodiments may use variations of AC or DC pulses and remain within the spirit and scope of the invention. For example, exponentially-decaying pulses, exponentially-increasing pulses, and combinations thereof may be used. Moreover, while certain embodiments of system 10 are described herein with respect to electroporation and high-frequency ablation therapy, it should be understood that system 10 may be used, additionally or alternatively, for other forms of ablation therapy.

FIG. 1 further shows a plurality of return electrodes designated 18, 20, and 21 that are diagrammatic of the body connections that may be used by the various sub-systems included in the overall system 10, such as a signal generator 26, an electrophysiology (EP) monitor such as an electrocardiogram (ECG) monitor 28, a visualization, navigation, and/or mapping system 30 for visualization, mapping and navigation of internal body structures. In the illustrated embodiment, return electrodes 18, 20, and 21 are patch electrodes. It should be understood that the illustration of a single patch electrode is diagrammatic only (for clarity), and that such sub-systems to which these patch electrodes are connected may, and typically will, include more than one patch (body surface) electrode. In other embodiments, return electrodes 18, 20, and 21 may be any other type of electrode suitable for use as a return electrode including, for example, one or more catheter electrodes. Return electrodes that are catheter electrodes may be part of electrode assembly 12 or part of a separate catheter (not shown). In some embodiments, for example, system 10 includes a bipolar catheter electrode assembly that includes a plurality of electrode pairs, where each electrode pair includes two electrodes with one electrode functioning as the return electrode.

System 10 may further include a computer system 32 (including an electronic control unit 50 and data storage-memory 52) that, in certain embodiments, may be integrated with visualization, navigation, and/or mapping system 30. Computer system 32 may further include conventional interface components, such as various user input/output mechanisms 34a and a display 34b, among other components.

In certain embodiments, system 10 includes an amplifier interface 27 having a switching matrix for selectively coupling a portion of the electrodes on the multi-electrode catheter 14 to respective channels of a signal generator 26, ECG monitor 28, and visualization, navigation, and/or mapping system 30. More specifically, for example, amplifier interface 27 connects electrodes of multi-electrode catheter 14 to respective channels of amplifiers within signal generator 26, ECG monitor 28, or visualization, navigation, and/or mapping system 30. Amplifier interface 27 selects which electrodes to enable based on, for example, operator input, tissue contact, catheter position, or electrogram measurements. For example, an operator may select a quadrant or hemisphere, or other sub-grouping of electrodes to enable. Alternatively, for example, amplifier interface 27 may enable only electrodes that detect tissue contact, or electrodes producing a certain threshold electrogram measurement.

In alternative embodiments, signal generator 26 or computer system 32 may include the switching matrix and be programmed or otherwise configured to execute an algorithm that identifies or selects which electrodes or electrode pairs of electrode assembly 12 to energize. That is, electrodes or electrode pairs of electrode assembly 12 may be selectively energized based on, for example, operator input, contact between the electrode(s) and tissue 16, catheter position or anatomical location of the electrode(s), or electrogram measurements.

For example, system 10 may include a suitable detector and tissue sensing circuit within amplifier interface 27, signal generator 26, or computer system 32 that identify which electrodes of electrode assembly 12 have characteristics (e.g., electrical characteristics such as impedance, phase angle, reactance, etc.) indicative of contact with tissue 16. Amplifier interface 27, signal generator 26, or computer system 32 may then select which electrodes or electrode pairs of catheter assembly 12 to energize based on the electrodes identified as being in contact with tissue 16. By way of example, if a basket catheter is inserted into the antrum of a pulmonary vein, amplifier interface 27 may determine which electrode(s) to activate based on contact with tissue 16, or even the specific anatomical location within the heart. Suitable components and methods for identifying electrodes in contact with tissue are described, for example, in U.S. Pat. No. 9,289,606, the disclosure of which is incorporated herein by reference in its entirety.

In the illustrative embodiment, multi-electrode catheter 14 includes a cable connector 40, or interface, a handle 42, and a shaft 44 having a proximal end 46 and a distal end 48. Multi-electrode catheter 14 may also include other conventional components not illustrated herein such as a temperature sensor, additional electrodes, and corresponding conductors or leads. The connector 40 provides mechanical and electrical connection(s) for cable 56 extending from signal generator 26. The connector 40 may include conventional components known in the art and, as shown, is disposed at the proximal end of multi-electrode catheter 14.

Handle 42 provides a location for the clinician to hold multi-electrode catheter 14 and may further provide means for steering or guiding shaft 44 within body 17. For example, handle 42 may include means to change the length of a guidewire extending through multi-electrode catheter 14 to distal end 48 of shaft 44 or means to steer shaft 44. Moreover, in some embodiments, handle 42 may be configured to vary the shape, size, or orientation of a portion of the catheter. Handle 42 is also conventional in the art and it will be understood that the construction of handle 42 may vary. In an alternate exemplary embodiment, multi-electrode catheter 14 may be robotically driven or controlled. Accordingly, rather than a clinician manipulating a handle to advance/retract and/or steer or guide multi-electrode catheter 14 (and shaft 44 thereof in particular), a robot is used to manipulate multi-electrode catheter 14. Shaft 44 is an elongated, tubular, flexible member configured for movement within body 17. Shaft 44 is configured to support electrode assembly 12 as well as contain associated conductors, and possibly additional electronics used for signal processing or conditioning. Shaft 44 may also permit transport, delivery and/or removal of fluids (including irrigation fluids and bodily fluids), medicines, and/or surgical tools or instruments. Shaft 44 may be made from conventional materials such as polyurethane and defines one or more lumens configured to house and/or transport electrical conductors, fluids or surgical tools. Shaft 44 may be introduced into a blood vessel or other structure within body 17 through a conventional introducer. Shaft 44 may then be advanced, retracted and/or steered or guided through body 17 to a desired location such as the site of tissue 16, including through the use of guidewires or other means known in the art.

In some embodiments, multi-electrode catheter 14 is a hoop catheter (shown, for example, in FIGS. 2 and 3), sometimes referred to as a spiral or loop catheter, having catheter electrodes distributed about one or more hoops at the distal end of shaft 44. The diameter of the hoop(s) (sometimes referred to herein as "loops") may be variable. In some embodiments, the hoop catheter diameter is variable by about ten millimeters (mm) between a minimum diameter and a maximum diameter. The minimum diameter in some embodiments may be selected between about thirteen mm and about twenty mm when the multi-electrode catheter 14 is manufactured. With a ten mm range of variability, such catheters would have a maximum diameter between twenty-three mm and thirty mm. In other embodiments, the hoop diameter is variable between about fifteen mm and about twenty eight mm, between about thirteen mm and about twenty-three mm, or between about seventeen mm and about twenty-seven mm. Alternatively, the catheter may be a fixed diameter hoop catheter or may be variable between different diameters. In some embodiments, multi-electrode catheter 14 has fourteen catheter electrodes (e.g., grouped as seven pairs of catheter electrodes). In other embodiments, multi-electrode catheter 14 includes ten catheter electrodes, twenty catheter electrodes, or any other suitable number of electrodes for performing, for example, sensing, mapping, diagnostics, or ablation. In some embodiments, the catheter electrodes are ring electrodes. Alternatively, the catheter electrodes may be any other suitable type of electrodes, such as single sided electrodes or electrodes printed on a flex material. In various embodiments, the catheter electrodes have lengths of 1.0 mm, 2.0 mm, 2.5 mm, and/or any other suitable length for sensing, mapping, diagnostics, or ablation.

Figure 2:
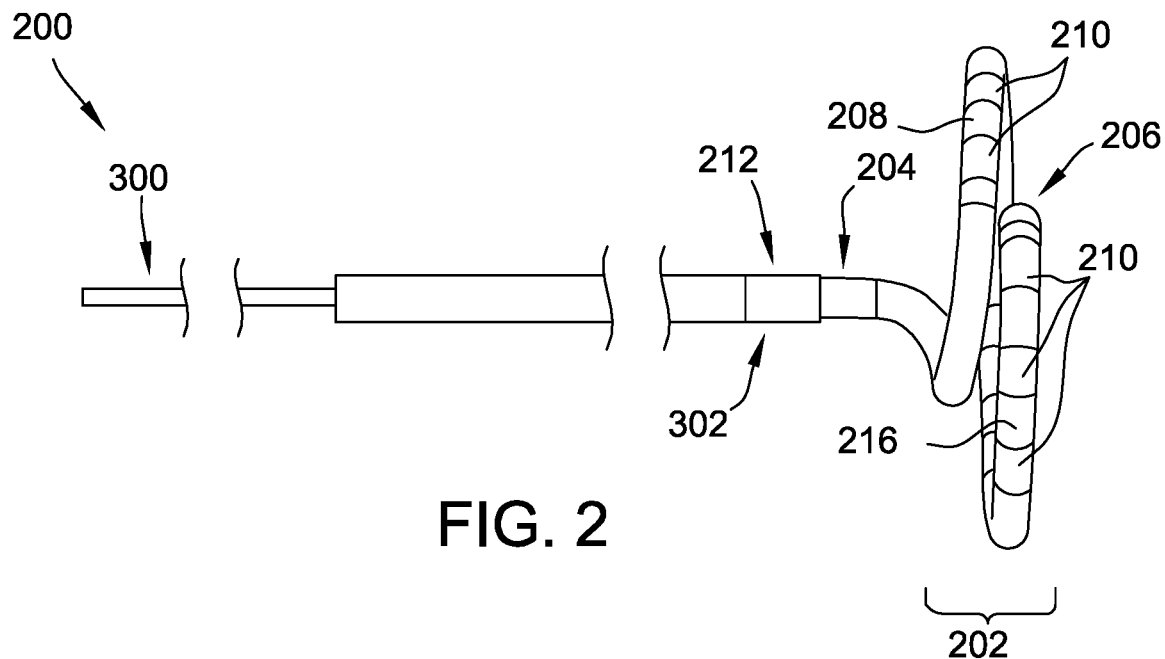
FIG. 2 is a side view of an example electrode assembly suitable for use in the system of FIG. 1, illustrated in the form of an electrode loop assembly.
Figure 3:
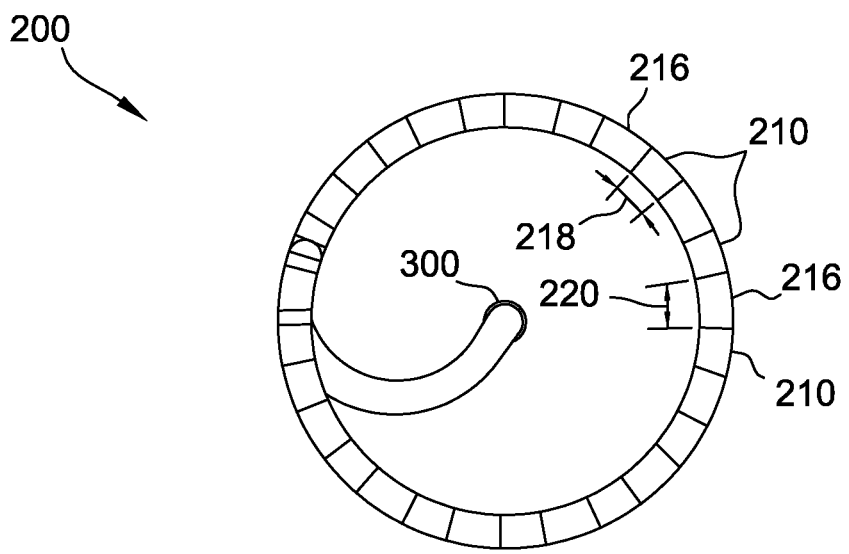
FIG. 3 is an end view of the electrode loop assembly of FIG. 2.

FIGS. 2 and 3 illustrate an exemplary electrode assembly 12 suitable for use in system 10, illustrated in the form of an electrode hoop or loop assembly 200. FIG. 2 is a side view of electrode loop assembly 200 with a variable diameter loop 202 coupled at the distal end 302 of a catheter shaft 300. FIG. 3 is an end view of variable diameter loop 202 of electrode loop assembly 200. As shown in FIGS. 2 and 3, electrode loop assembly 200 extends from a proximal end 204 to a distal end 206, and includes an outer sleeve 208 formed in the shape of a loop, and a plurality of catheter electrodes 210 mounted on outer sleeve 208. Proximal end 204 of electrode loop assembly 200 is coupled to catheter shaft 300 via a suitable coupler 212. Electrodes 210 may be used for a variety of diagnostic and therapeutic purposes including, for example and without limitation, cardiac sensing, mapping, diagnostics, or ablation (e.g., high-frequency ablation). For example, electrode loop assembly 200 may be configured as a bipolar electrode assembly for use in bipolar-based ablation therapy. More specifically, electrodes 210 may be configured as electrode pairs (e.g., cathode-anode electrode pairs) and electrically coupled to amplifier interface 27 (e.g., via suitable electrical wire or other suitable electrical conductors extending through catheter shaft 44) such that adjacent electrodes 210 are energized with opposite polarities to generate a potential and corresponding electric field in tissue 16 to enable mapping of heart walls.

In other embodiments, any combination of electrodes 210 may be configured as electrode pairs (e.g., cathode-anode electrode pairs), including, for example and without limitation, adjacent electrodes, non-adjacent electrodes, and any other combination of electrodes that enables system 10 to function as described herein. As described above, for example, amplifier interface 27 selectively energize certain electrodes 210 of electrode loop assembly 200 to form electrode pairs based on, for example, user input, contact between electrodes 210 and tissue 16, catheter position, or electrogram measurements. In yet other embodiments, electrode loop assembly 200 may be configured other than as a bipolar electrode assembly, such as a unipolar electrode assembly. In such embodiments, electrode 18 may function as the return electrode.

In the illustrated embodiment, variable diameter loop 202 includes fourteen catheter electrodes 210 evenly spaced around the circumference of variable diameter loop 202. In other embodiments, variable diameter loop 202 may include any suitable number of catheter electrodes 210 made of any suitable material. Each catheter electrode 210 is separated from each other catheter electrode by an insulated gap 216. In the example embodiment, each catheter electrode 210 has a same length 218 (shown in FIG. 3) and each insulated gap 216 has a same length 220 as each other gap 216. Length 218 and length 220 are both about 2.5 mm in the example embodiment. In other embodiments, length 218 and length 220 may be different from each other. Moreover, in some embodiments, catheter electrodes 210 may not all have the same length 218 and/or insulated gaps 216 may not all have the same length 220. In some embodiments, catheter electrodes 210 are not spaced evenly around the circumference of variable diameter loop 202.

Figure 4:
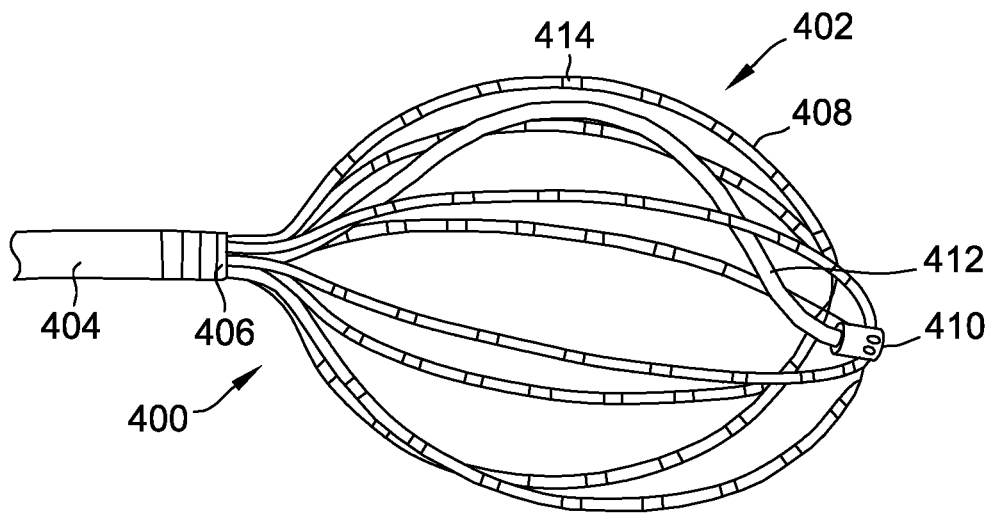
FIG. 4 is a perspective view of another example electrode assembly suitable for use in the system of FIG. 1, illustrated in the form of a basket electrode assembly.

FIG. 4 is a perspective view of another exemplary electrode assembly 12 suitable for use in system 10, illustrated in the form of a basket electrode assembly 400. Basket electrode assembly 400 includes a basket 402 coupled to a catheter body 404 by a suitable proximal connector 406. Basket 402 includes a plurality of splines 408 and a distal coupler 410 at which each of splines 408 terminates. In some embodiments, such as the illustrated embodiment, basket electrode assembly 400 may also include irrigation tubing 412 (e.g., to supply fluids to basket electrode assembly 400). In other embodiments, irrigation tubing 412 may be omitted. Each of the plurality of splines 408 includes at least one electrode 414. In the illustrated embodiment, each of the plurality of splines includes eight electrodes 414, although each spline 408 may include more than or less than eight electrodes 414.

Electrodes 414 may be used for a variety of diagnostic and therapeutic purposes including, for example and without limitation, cardiac sensing, mapping, or diagnostics. Certain embodiments of basket electrode assembly 400 and, more specifically, electrodes 414 may be adapted for use in high-frequency ablation or electroporation. High-frequency ablation and electroporation generally demand more power and stronger electric fields be delivered to target tissue 16, which may be accommodated by increasing the effective size of electrodes relative to those conventionally used for sensing, mapping, and diagnostics. Basket electrode assembly 400 may be configured as a bipolar electrode assembly for use in bipolar-based ablation. Electrodes 414 positioned on adjacent splines 408 may be configured as electrode pairs (e.g., cathode-anode electrode pairs) and electrically coupled to amplifier interface 27 (e.g., via suitable electrical wire or other suitable electrical conductors extending through catheter shaft 44) such that electrodes 414 on adjacent splines 408 are energized with opposite polarities to generate a potential and corresponding electric field between electrodes 414 of adjacent splines 408. In other embodiments, electrodes 414 positioned along the same spline 408 may be configured as electrode pairs. In yet other embodiments, any combination of electrodes 414 may be configured as electrode pairs, including, for example and without limitation, adjacent electrodes, non-adjacent electrodes, electrodes on adjacent splines, electrodes on non-adjacent splines, and any other combination of electrodes that enables system 10 to function as described herein. As described above, for example, amplifier interface 27 selectively activates certain electrodes 414 of basket electrode assembly 400 to form electrode pairs based on contact between electrodes 414 and tissue 16. In other embodiments, basket electrode assembly 400 may be configured other than as a bipolar electrode assembly, such as a unipolar electrode assembly. In such embodiments, electrode 18 may function as the return electrode.

Figure 5:
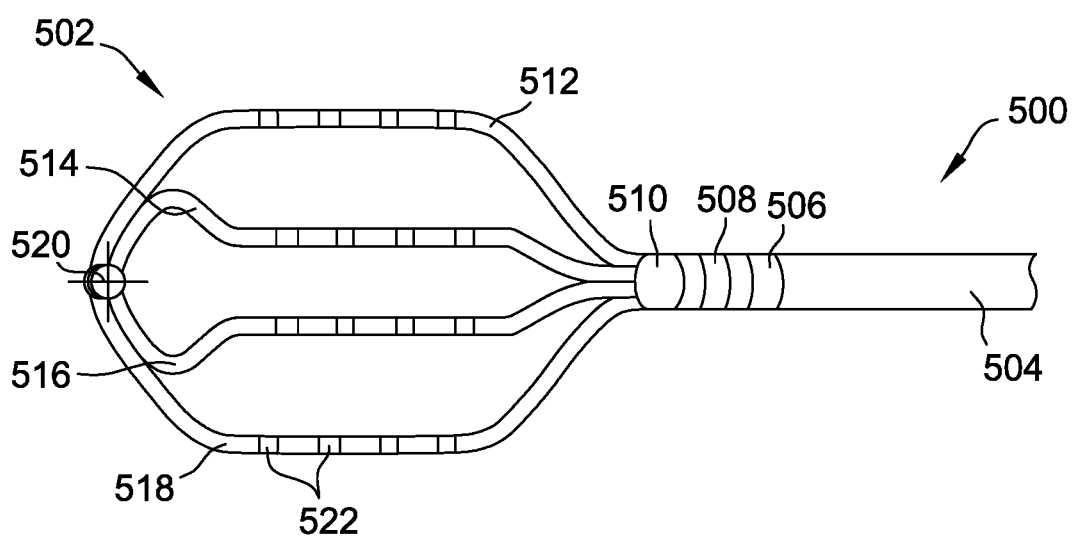
FIG. 5 is a perspective view of another example electrode assembly suitable for use in the system of FIG. 1, illustrated in the form of a grid electrode assembly.

FIG. 5 is a perspective view of another exemplary electrode assembly 12 suitable for use in system 10, illustrated in the form of a planar or grid electrode assembly 500. Grid electrode assembly 500 includes a paddle 502 coupled to a catheter body 504. In the illustrated embodiment, catheter body 504 includes body electrodes 506, 508, and 510 coupled thereto. In the illustrated embodiment, paddle 502 includes a first spline 512, a second spline 514, a third spline 516, and a fourth spline 518 coupled to catheter body 504 by a proximal coupler and coupled to each other by a distal connector 520 at a distal end of paddle 502. In one embodiment, first spline 512 and fourth spline 518 can be one continuous segment, and second spline 514 and third spline 516 can be another continuous segment. In other embodiments the various splines can be separate segments coupled to each other. The plurality of splines can further comprise a varying number of electrodes 522. The electrodes in the illustrated embodiment can comprise ring electrodes evenly spaced along the splines. In other embodiments the electrodes can be evenly or unevenly spaced and the electrodes can comprise point or other types of electrodes.

Electrodes 522 may be used for a variety of diagnostic and therapeutic purposes including, for example and without limitation, cardiac sensing, mapping, or diagnostics. Certain embodiments of grid electrode assembly 500 and, more specifically, electrodes 522 may be adapted for high-frequency ablation or electroporation. High-frequency ablation and electroporation generally demand more power and stronger electric fields be delivered to target tissue 16, which may be accommodated by increasing the effective size of electrodes relative to those conventionally used for sensing, mapping, and diagnostics. Grid electrode assembly 500 may be configured as a bipolar electrode assembly for use in bipolar-based ablation. Adjacent electrodes 522 may be configured as electrode pairs (e.g., cathode-anode electrode pairs) and electrically coupled to amplifier interface 27 (e.g., via suitable electrical wire or other suitable electrical conductors extending through catheter shaft 44) such that adjacent electrodes 522 are energized with opposite polarities to generate a potential and corresponding electric field between adjacent electrodes 522. Adjacent electrodes 522 that form a bipolar pair may be located along the same spline (e.g., electrodes 522 along first spine 512) or across adjacent splines. In one embodiment, for example, electrode pairs may be formed between one electrode 522 (e.g., a cathode) located on first spline 512 and another, adjacent electrode 522 (e.g., an anode) located on adjacent second spline 514. In other embodiments, any combination of electrodes 522 may be configured as electrode pairs (e.g., cathode-anode electrode pairs), including, for example and without limitation, adjacent electrodes, non-adjacent electrodes, electrodes on adjacent splines, electrodes on non-adjacent splines, and any other combination of electrodes that enables system 10 to function as described herein. As described above, for example, amplifier interface 27 selectively activate certain electrodes 522 of grid electrode assembly 500 to form electrode pairs based on contact between electrodes 522 and tissue 16. In other embodiments, grid electrode assembly 500 may be configured other than as a bipolar electrode assembly, such as a unipolar electrode assembly. In such embodiments, electrode 18 may function as the return electrode.

First spline 512, second spline 514, third spline 516, and fourth spline 518 are generally aligned in the same (topological) plane. Although paddle 502 is illustrated as relatively flat or planar in FIG. 5, it should be understood that paddle 502 may bend, curl, buckle, twist, and/or otherwise deform. Accordingly, the plane defined by paddle 502 and splines 512, 514, 516, and 518 may correspondingly deform, such that the plane is a non-flat topological plane.

It should be understood that electrode assembly 12 is not limited to the specific constructions shown and described herein, and may include any other suitable electrode assembly and have any other suitable construction that enables system 10 to function as described herein. By way of example, electrode assembly 12 may have the same or similar construction as electrode assemblies described in U.S. Pat. No. 10,136,829, U.S. Patent Application Publication Nos. 2018/0014751 and 2019/0201688, International Patent Application Publication No. WO2018/208795, and U.S. Provisional Patent Application Ser. Nos. 62/861,135 and 62/842,654, the disclosures of which are incorporated herein by reference in their entirety.

Referring again to FIG. 1, the visualization, navigation, and/or mapping system 30 can comprise an electric field-based system, or, sometimes referred to as an impedance based system, such as, for example, that having the model name EnSite NAVX™ system and commercially available from Abbott Laboratories, and as generally shown with reference to U.S. Pat. No. 7,263,397 titled "Method and Apparatus for Catheter Navigation and Location and Mapping in the Heart," the entire disclosure of which is incorporated herein by reference. The visualization, navigation, and/or mapping system 30 can also include other commercially available systems, including the EnSite™ Velocity™ or EnSite Precision™ cardiac mapping and visualization systems of Abbott Laboratories. In other exemplary embodiments, the visualization, navigation, and/or mapping system 30 can comprise other types of systems, such as, for example and without limitation: a magnetic field-based system such as the CARTO System (now in a hybrid form with impedance- and magnetically-driven electrodes) available from Biosense Webster, or the gMPS system from MediGuide Ltd. In accordance with a combination electric field-based and magnetic field-based system, the catheter can include both electrodes as impedance-based electrodes and one or more magnetic field sensing coils. Commonly available fluoroscopic, computed tomography (CT), and magnetic resonance imaging (MRI)-based systems can also be used. In alternative embodiments, visualization, navigation, and/or mapping system 30 may be integrated with amplifier interface 27.

Signal generator 26 and visualization, navigation, and/or mapping system 30 are configured to activate the electrode element(s) through amplifier interface 27 in accordance with an energization strategy, which may be predetermined or may be user-selectable. For electroporation-induced primary necrosis therapy, for example, signal generator 26 may be configured to produce an electric current that is delivered via electrode assembly 12 as a pulsed electric field in the form of short-duration DC pulses transmitted between closely spaced electrodes (e.g., electrode pairs of electrode assembly 12) and capable of delivering an electric field strength of about 0.1 to 1.0 kV/cm (e.g., at the tissue site). Alternatively, for sensing, mapping, or diagnostics, visualization, navigation, and/or mapping system 30 produces an electric current that is delivered via electrode assembly 12 as a DC signal configured to deliver a modulated electric field that can be modified by the blood and tissue, and detected by electrodes of electrode assembly 12. AC or DC waveforms generated by signal generator 26 pass through an amplifier stage prior to conducting the length of multi-electrode catheter 14. The amplifier stage of signal generator 26 or visualization, navigation, and/or mapping system 30 often have a limited number of channels to individually drive the numerous electrode elements on electrode assembly 12. Amplifier interface 27 selects which electrodes to energize and controls a switching matrix to connect the selected electrodes to the available channels in the amplifier stages of signal generator 26 and visualization, navigation, and/or mapping system 30.

In some embodiments, signal generator 26 is a monophasic or biphasic signal generator configured to generate a series of DC pulses. In other embodiments, signal generator 26 is a high-frequency signal generator configured to generate AC signals at frequencies in the range of about 350 kilohertz (KHz) and 500 KHz. In some embodiments, signal generator 26 is configured to output energy in waveforms at selectable energy levels, such as fifty joules, one-hundred joules, two-hundred joules, and the like. Other embodiments may have more or fewer energy settings, and the values of the available settings may be the same or different. In some embodiments, signal generator 26 outputs or generates a pulse having a magnitudes between about 600 V and about 3.5 kV. Other embodiments may output or generate any other suitable voltage.

In certain embodiments, amplifier interface 27 may include a variable impedance. The variable impedance may be used to change one or more characteristics, such as amplitude, duration, pulse shape, and the like, of an output of signal generator 26 or visualization, navigation, and/or mapping system 30. Although described as a component of amplifier interface 27, the variable impedance may be implemented separate from amplifier interface 27 or integrated with multi-electrode catheter 14 or signal generator 26 and visualization, navigation, and/or mapping system 30. The variable impedance includes one or more impedance elements, such as resistors, capacitors, or inductors (not shown) connected in series, parallel, or combinations of series and/or parallel. In the illustrated embodiment, the variable impedance is connected in series with multi-electrode catheter 14. Alternatively, the impedance elements of variable impedance 27 may be connected in parallel with multi-electrode catheter 14 or in a combination of series and parallel with multi-electrode catheter 14. Moreover, in other embodiments, the impedance elements of the variable impedance are connected in series and/or parallel with return electrode 18. Some embodiments include more than one variable impedance, each of which may include one or more impedance elements. In such embodiments, each variable impedance may be connected to a different catheter electrode or group of catheter electrodes to allow the impedance through each catheter electrode or group of catheter electrodes to be independently varied. In other embodiments, the impedance of system 10 may not need to be varied and the variable impedance may be omitted.

Figure 6:
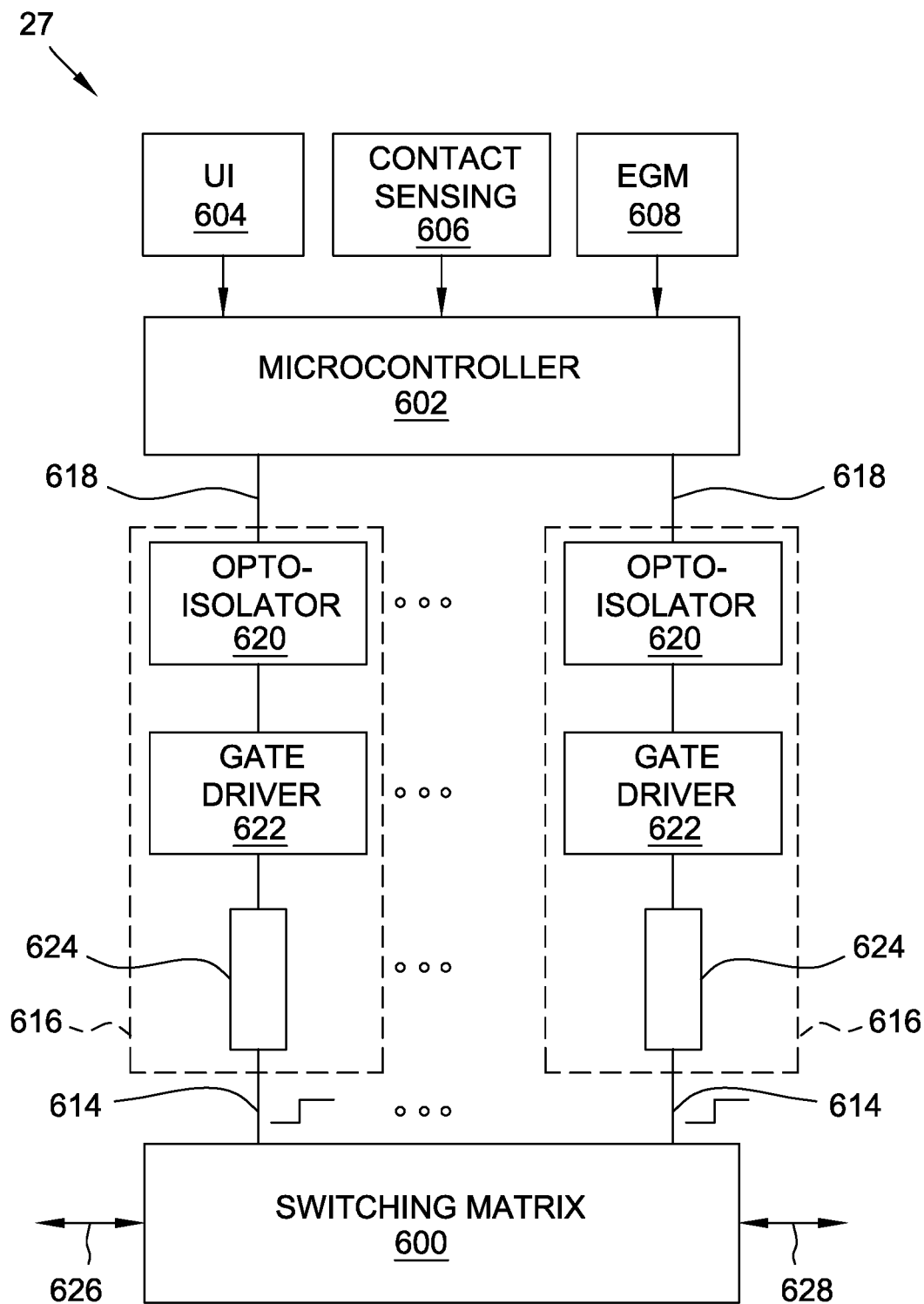
FIG. 6 is a block diagram of an example amplifier interface for use in the system of FIG. 1.
Figure 7:
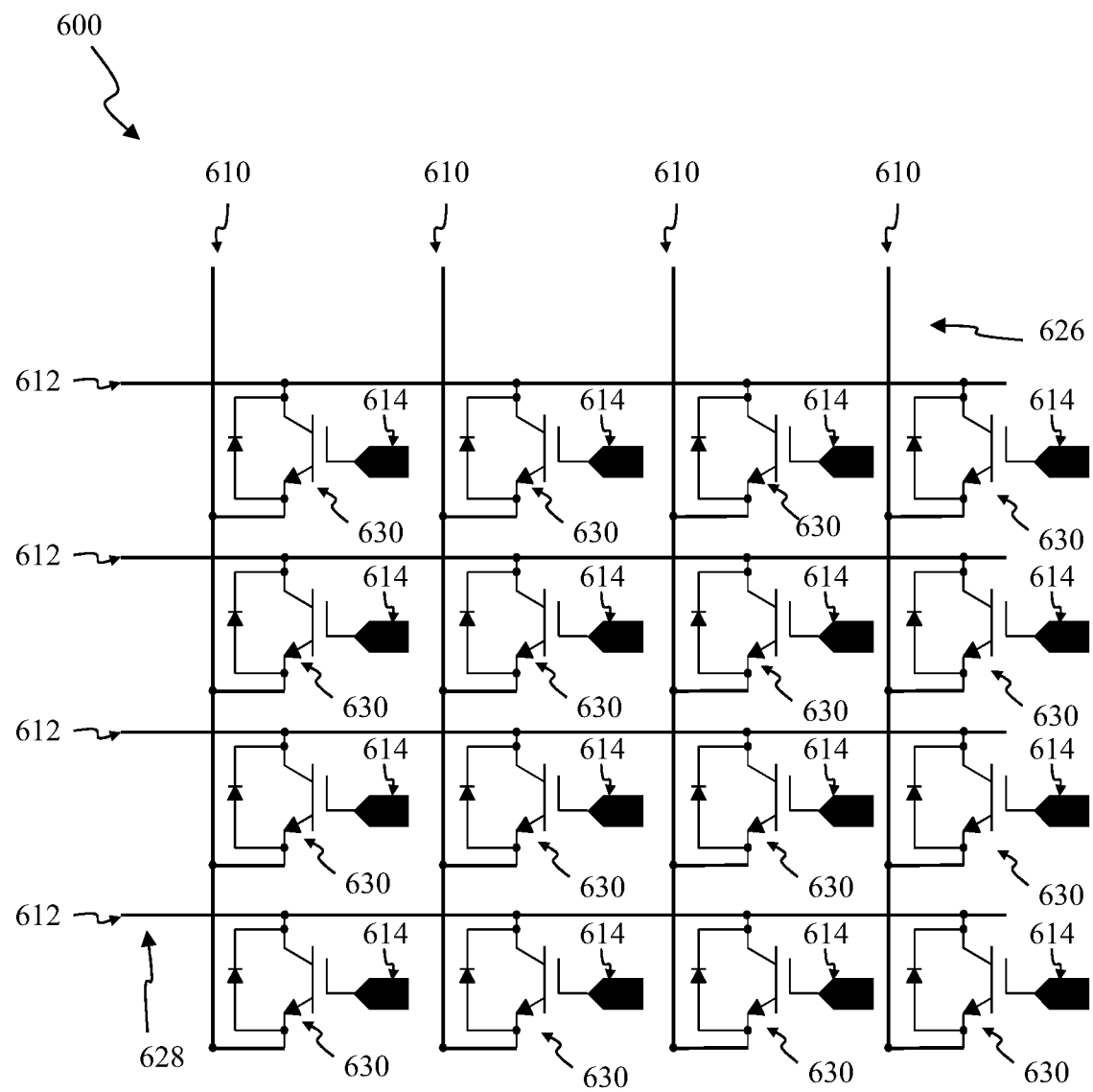
FIG. 7 is a schematic diagram of a switching matrix for use in the amplifier interface shown in FIG. 6.

FIG. 6 is a schematic diagram of an example amplifier interface 27 for use in system 10 shown in FIG. 1. FIG. 7 is a schematic diagram of an example switching matrix 600 for use in amplifier interface 27. Amplifier interface 27 includes switching matrix 600 operated by a microcontroller 602. In certain embodiments, amplifier interface 27 includes a user interface (UI) 604, a contact sensing system 606, and/or an electrogram system 608 for determining how to operate switching matrix 600 to electrically couple one or more interface channels 610 to one or more catheter channels 612. For example, user input received through UI 604 may indicate which electrodes or regions of electrodes on a multi-electrode catheter should be used for a given function, such as sensing, mapping, diagnostics, or ablation. Likewise, contact sensing system 606 may determine which electrodes on the multi-electrode catheter are in contact with tissue at a target location in the patient, and microcontroller 602 would operate switching matrix 600 to electrically couple corresponding catheter channels 612 to interface channels 610. Likewise, electrogram system 608 may determine which electrodes on the multi-electrode catheter produce a minimum threshold voltage amplitude (e.g., 0.5 millivolt or 1.0 millivolt), and microcontroller 602 would operate switching matrix 600 to electrically couple corresponding catheter channels 612 to interface channels 610.

UI 604 may be integrated with amplifier interface 27 locally or remotely. That is, amplifier interface 27 may include a single package that includes UI 604, or may include a remote device (not shown) that incorporates UI 604. For example, UI 604 may be incorporated into a remote desktop or laptop computer in communication with amplifier interface 27. Similarly, contact sensing system 606 and/or electrogram system 608 may be incorporated into amplifier interface 27 or may be integrated as a separate system with which amplifier interface 27 communicates.

Figure 8:
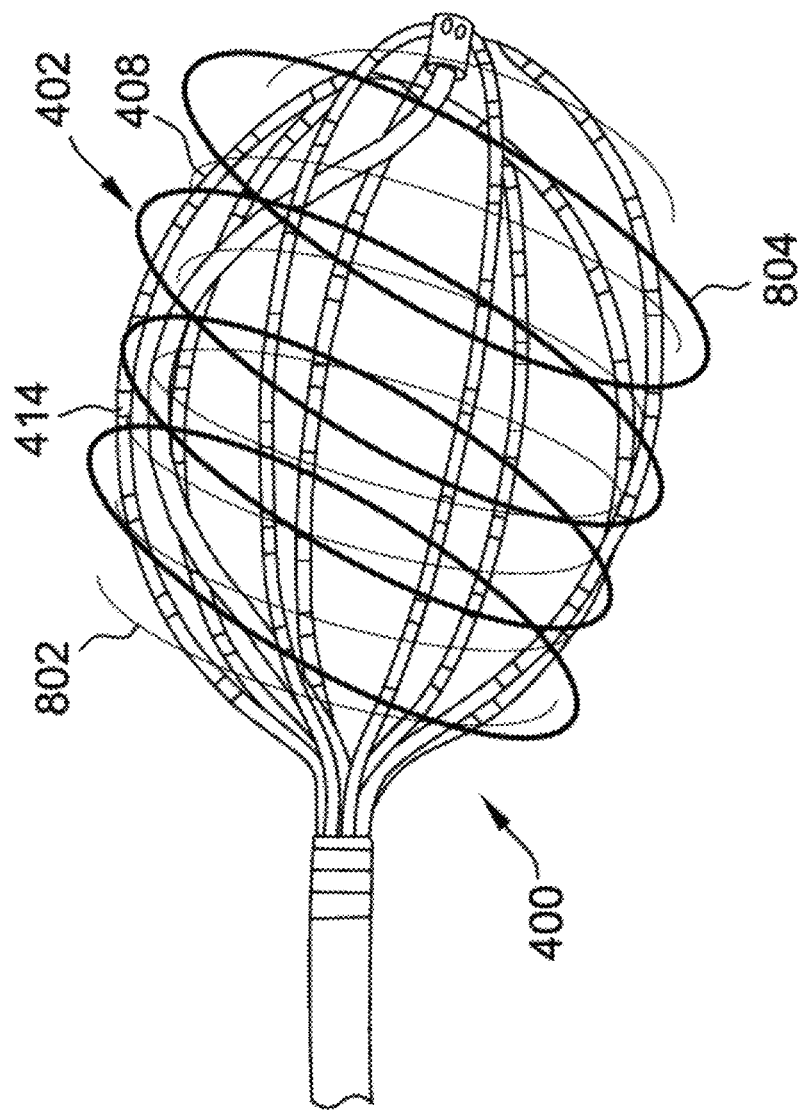
FIG. 8 is another perspective view of the electrode assembly shown in FIG. 4, and illustrating electrode patterns.

The numerous electrodes of the embodiments of electrode assemblies shown in FIGS. 2-5 for the multi-electrode catheter may be selected individually or may be selected as a group of electrodes based on their respective position in a given quadrant, hemisphere, or general region on the electrode assembly. For example, electrodes 414 on electrode assembly 400 are distributed about a plurality of splines 408. Thus, electrodes 414 may be selected individually or as a group based on, for example, on which spline 408 they are disposed, or in which quadrant or hemisphere of the basket 402 they are disposed. Similarly, electrodes 414 may be selected in groups across spline 408 to define certain electrode patterns. For example, FIG. 8 shows example electrode patterns for electrode assembly 400. Electrodes 414 may be selected to form one or more circumferential ring patterns 802 around the basket 402 and generally co-axial with the catheter body itself. Alternatively, electrodes 414 may be selected to form one or more oblong ring patterns 804 around the basket 402 of electrode assembly 400.

Different individual electrodes, groups of electrodes, electrode patterns, splines, quadrants, hemispheres, or other regions of electrodes may be selected as a result, for example, of a determinations received from UI 604, contact sensing system 606, or electrogram system 608. In one example, contact sensing system 606 may determine more electrodes are in contact with tissue in a distal hemisphere than in a proximal hemisphere. Accordingly, microcontroller 602 may operate switching matrix 600 to select the distal hemisphere of electrodes and electrically couple corresponding catheter channels 612 to interface channels 610.

Upon determining which catheter channels 612 should be selected, microcontroller 602 operates switching matrix 600 by generating a plurality of control signals 614, or gate signals, for controlling an array of switching elements within switching matrix 600. For the purpose of generating control signals 614, amplifier interface 27 includes a plurality of gate drive circuits 616 for each switching element of switching matrix 600. Gate drive circuits 616 operate to condition logic signals 618 output by microcontroller 906 (e.g., a discrete logic-level DC signal) into control signals 614 having suitable voltage and power characteristics to drive gates of the switching elements, and to provide electrical isolation between switching elements of switching matrix 600 and microcontroller 602. For example, in certain embodiments, gate drive circuits 616 include an opto-isolator 620, a gate driver 622, and a gate impedance 624.

Switching matrix 600 includes a first interface 626 having interface channels 610 and a second interface 628 having catheter channels 612. First interface 626 is illustrated in FIG. 7, for clarity of disclosure, with four interface channels. However, first interface 626 can include any number of interface channels to suit the number of channels at the amplifier stages, for example, of signal generator 26, ECG monitor 28, and visualization, navigation, and/or mapping system 30. Likewise, second interface 628 is illustrated in FIG. 7, for clarity of disclosure, with four catheter channels. However, second interface 628 can include any number of catheter channels to match the number of electrodes of the multi-electrode catheter. Generally, signal generator 26, ECG monitor 28, and visualization, navigation, and/or mapping system 30 are referred to in combination as having a first quantity of amplifier channels that transmit or receive electrical signals and, accordingly, switching matrix 600 should have at least the first quantity of interface channels 610 to which the amplifier channels can be connected.

Generally, switching matrix 600 is referred to as having a second quantity of catheter channels 612 that are configured to be respectively electrically coupled to corresponding electrode leads of multi-electrode catheter 14. Further, there is generally a mismatch between the first quantity of amplifier channels and the second quantity of catheter channels. As multi-electrode catheters incorporate increasingly more electrodes, the second quantity of catheter channels is generally greater than the first quantity of amplifier channels. Accordingly, switching matrix 600 may include the first quantity of interface channels or more, although any number of interface channels in excess of the first quantity of amplifier channels would be unused. Likewise, the second quantity of catheter channels 612 of switching matrix 600 is chosen to match the number of electrodes of multi-electrode catheter 14. However, either multi-electrode catheter 14 or switching matrix 600 may include more catheter channels than the other, and any excess channels in multi-electrode catheter 14 or switching matrix 600 would be unused without changing the structure or overall operation of amplifier interface 27 or switching matrix 600.

Generally, where the number of electrodes on multi-electrode catheter 14 is greater than the number of amplifier channels, switching matrix 600 incorporates a greater number of catheter channels 612 in second interface 628 than interface channels 610 in first interface 626, which enables selection of a subset of catheter channels 612 to connect to the first quantity of interface channels 610 and the corresponding amplifier channels. For example, in one embodiment, multi-electrode catheter 14 may include more than 100 electrodes, e.g., 128 electrodes, and signal generator 26 and visualization, navigation, and/or mapping system 30 combined may include 64 channels at their amplifier stages. Switching matrix 600 enables connection of a subset of the 128 electrodes, via the second quantity of catheter channels 612, to the first quantity of amplifier channels, via interface channels 610. Notably, the first quantity of interface channels 610 may include 64 interface channels 610, fewer interface channels 610, or greater than 64 interface channels 610. With fewer interface channels 610 than amplifier channels on signal generator 26 and visualization, navigation, and/or mapping system 30, amplifier interface 27 and switching matrix 600 can only selectively connect a subset of the amplifier channels to electrodes of multi-electrode catheter 14, the balance of which may be unused or, for example, coupled directly to another amplifier, mapping system, navigation system, or ECG monitor 128. Similarly, with more interface channels 610 than amplifier channels on signal generator 26 and visualization, navigation, and/or mapping system 30, amplifier interface 27 and switching matrix 600 may only use a subset of interface channels 610 to fully utilize the first quantity of amplifier channels.

Switching matrix 600 includes an array of semiconductor switches 630 coupled between each interface channel 610 and each catheter channel 612. Each semiconductor switch provides a low-impedance path between one interface channel 610 and one catheter channel 612, and is controlled by one of control signals 614 provided at its gate. For example, when a control signal 614 transitions to high, it may commutate one semiconductor switch 630 to close the low-impedance path. In alternative embodiments, semiconductor switches 630 may commutate upon receiving a low voltage signal at its gate, e.g., ground or zero volt.

Figure 9:
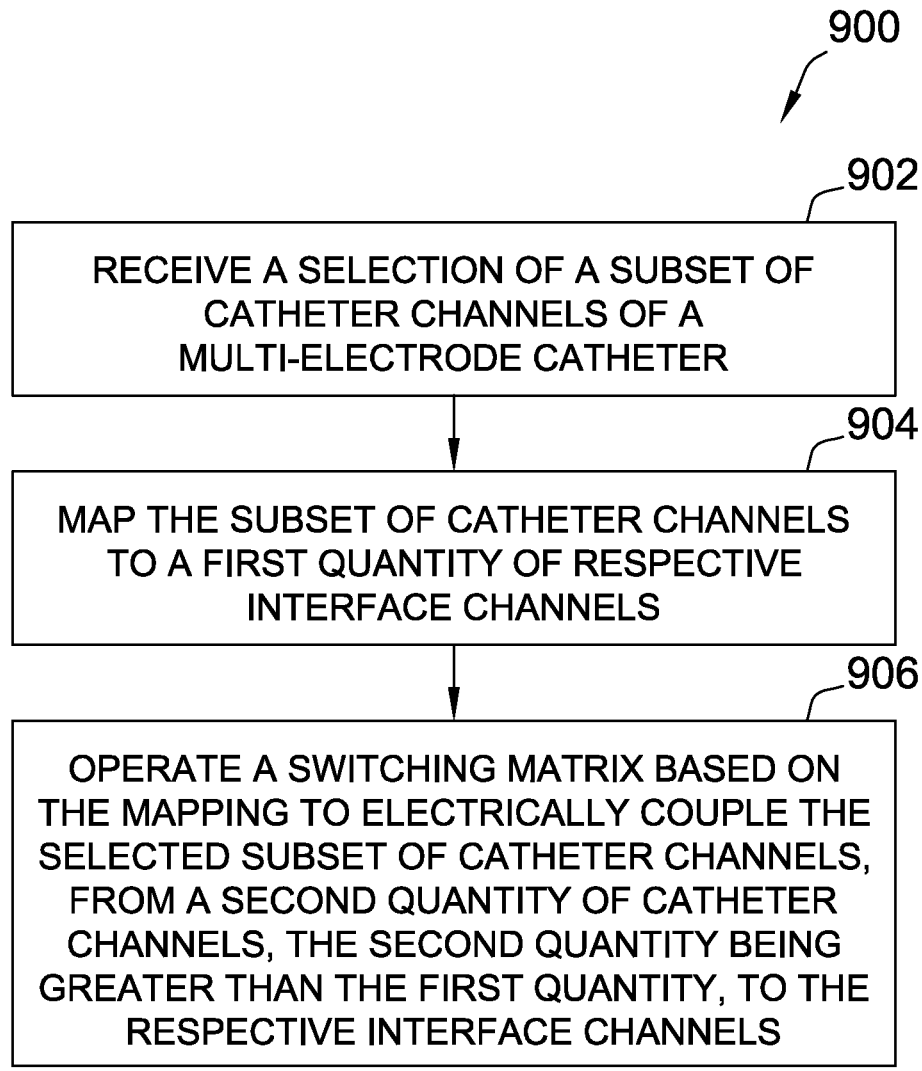
FIG. 9 is a flow diagram of an example method of coupling a signal generator to a multi-electrode catheter.

FIG. 9 is a flow diagram of an example method 900 of coupling an amplifier stage, such as the amplifier stage of signal generator 26, ECG monitor 28, or visualization, navigation, and/or mapping system 30, or a combination thereof, to a multi-electrode catheter. Coupling is carried out, for example, by amplifier interface 27. In alternative embodiments, structural and functional aspects of amplifier interface 27 may be incorporated, for example, into signal generator 26 or visualization, navigation, and/or mapping system 30, or another system for driving a multi-electrode catheter.

Amplifier interface 27 receives 902 a selection of a subset of catheter channels 612 for the multi-electrode catheter. The selection may be received 902, for example, from UI 604, from contact sensing system 606, or from electrogram system 608. Upon receiving 802 the selection, microcontroller 602 maps 904 the subset of catheter channels 612 to the first quantity of respective interface channels 610. The mapping 904 is a process by which each selected catheter channel 610 is allocated to an interface channel and, accordingly, an amplifier channel, for example, of signal generator 26, ECG monitor 28, or visualization, navigation, and/or mapping system 30. The mapping 904 may be carried out according to an algorithm, according to a look-up table of channel assignments, or serially one catheter channel 612 at a time or one interface channel 610 at a time. Microcontroller 602 then operates 906 switching matrix 600 based on the mapping to electrically couple the selected subset of catheter channels 612 to the respective interface channels 610.

Although certain steps of the example method are numbered, such numbering does not indicate that the steps must be performed in the order listed. Thus, particular steps need not be performed in the exact order they are presented, unless the description thereof specifically require such order. The steps may be performed in the order listed, or in another suitable order.

Although the embodiments and examples disclosed herein have been described with reference to particular embodiments, it is to be understood that these embodiments and examples are merely illustrative of the principles and applications of the present disclosure. It is therefore to be understood that numerous modifications can be made to the illustrative embodiments and examples and that other arrangements can be devised without departing from the spirit and scope of the present disclosure as defined by the claims. Thus, it is intended that the present application cover the modifications and variations of these embodiments and their equivalents.

Some embodiments involve the use of one or more electronic processing or computing devices. As used herein, the terms "processor" and "computer" and related terms, e.g., "processing device", "computing device", and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

This written description uses examples to disclose the invention, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-electrode ablation catheter system comprising:
a multi-electrode ablation catheter comprising a handle;
a signal generator comprising an amplifier stage having a plurality of amplifier channels; and
an amplifier interface electrically coupled between the handle of the multi-electrode ablation catheter and the signal generator, the amplifier interface comprising:
a first interface having a plurality of interface channels, wherein a quantity of the plurality of amplifier channels is a first quantity, wherein a quantity of the plurality of interface channels is greater than or equal to the first quantity, and wherein the amplifier channels are respectively electrically coupled to the interface channels,
a second interface having a second quantity of catheter channels, the second quantity being greater than the first quantity, wherein the catheter channels are configured to be respectively electrically coupled to corresponding electrode leads of the multi-electrode ablation catheter, and
a switching matrix electrically coupled between the first interface and the second interface, the switching matrix configured to selectively electrically couple a selected subset of catheter channels to respective interface channels of the plurality of interface channels.

2. The multi-electrode ablation catheter system of claim 1, wherein the amplifier stage is configured to transmit direct current (DC) waveform over the plurality of amplifier channels, through the respective interface channels, through the switching matrix, through the selected subset of catheter channels, and to the corresponding electrode leads of the multi-electrode ablation catheter.

3. The multi-electrode ablation catheter system of claim 1 further comprising an electrocardiogram monitor configured to measure electrical activity over at least a subset of the plurality of amplifier channels, through the respective interface channels, through the switching matrix, through the selected subset of catheter channels, and through the corresponding electrode leads of the multi-electrode ablation catheter.

4. The multi-electrode ablation catheter system of claim 1, wherein the switching matrix comprises an array of semiconductor switches, wherein each semiconductor switch is coupled between one of the plurality of interface channels and one of the plurality of catheter channels.

5. The multi-electrode ablation catheter system of claim 4, wherein the amplifier interface further comprises a user interface configured to receive a user input representative of the selected subset of catheter channels, and wherein the microcontroller is further configured to select the selected subset of catheter channels based on the user input.

6. The multi-electrode ablation catheter system of claim 4, wherein the amplifier interface further comprises a contact sensing system configured to determine which electrodes of the multi-electrode ablation catheter are in contact with tissue, and wherein the microcontroller is further configured to select the selected subset of catheter channels based on which electrodes are in contact with tissue.

7. The multi-electrode ablation catheter system of claim 4, wherein the amplifier interface further comprises an electrogram system configured to determine which electrodes of the multi-electrode ablation catheter produce an electrogram signal having an amplitude above a predetermined threshold, and wherein the microcontroller is further configured to select the selected subset of catheter channels based on electrogram amplitudes.

8. The multi-electrode ablation catheter system of claim 1, wherein the multi-electrode ablation catheter includes at least 100 electrodes.

9. An amplifier interface for a multi-electrode ablation catheter comprising a handle, the amplifier interface electrically coupleable between the handle of the multi-electrode ablation catheter and a signal generator, the amplifier interface comprising:
- a first interface having a plurality of interface channels configured to be electrically coupled to a plurality of corresponding amplifier channels of an amplifier stage of the signal generator, wherein a quantity of the plurality of amplifier channels is a first quantity, and wherein a quantity of the plurality of interface channels is greater than or equal to the first quantity;
- a second interface having a second quantity of catheter channels, the second quantity being greater than the first quantity, wherein the catheter channels are configured to be respectively electrically coupled to corresponding electrode leads of the multi-electrode ablation catheter; and
- a switching matrix electrically coupled between the first interface and the second interface, the switching matrix configured to selectively electrically couple a selected subset of catheter channels to respective interface channels of the plurality of interface channels.

10. The amplifier interface of claim 9, wherein the switching matrix comprises an array of semiconductor switches coupled between each interface channel, of the plurality of interface channels, and each catheter channel, of the second quantity of catheter channels.

11. The amplifier interface of claim 10 further comprising a microcontroller and a plurality of gate driving circuits corresponding to the array of semiconductor switches, wherein the microcontroller is configured to operate the plurality of gate driving circuits to close a selected subset of the array of semiconductor switches corresponding to the selected subset of catheter channels and the respective interface channels.

12. The amplifier interface of claim 11 further comprising a user interface configured to receive a user input representative of the selected subset of catheter channels, and wherein the microcontroller is further configured to select the selected subset of catheter channels based on the user input.

13. The amplifier interface of claim 11, wherein the amplifier interface further comprises a contact sensing system configured to determine which electrodes of the multi-electrode ablation catheter are in contact with tissue, and wherein the microcontroller is further configured to select the selected subset of catheter channels based on which electrodes are in contact with tissue.

14. The amplifier interface of claim 11, wherein the amplifier interface further comprises an electrogram system configured to determine which electrodes of the multi-electrode ablation catheter produce an electrogram signal having an amplitude above a predetermined threshold, and wherein the microcontroller is further configured to select the selected subset of catheter channels based on electrogram amplitudes.

15. A method of coupling an amplifier stage of a signal generator to a multi-electrode ablation catheter including a handle, the method comprising:
- coupling an amplifier interface between the handle of the multi-electrode ablation catheter and the signal generator by coupling each of a plurality of amplifier channels of the amplifier stage to respective interface channels of a plurality of interface channels of the amplifier interface, wherein a quantity of the plurality of amplifier channels is a first quantity, and wherein a quantity of the plurality of interface channels is greater than or equal to the first quantity;
- receiving a selection of a subset of catheter channels of the amplifier stage;
- mapping the subset of catheter channels to the plurality of interface channels; and
- operating a switching matrix based on the mapping to electrically couple the selected subset of catheter channels, from a second quantity of catheter channels, the second quantity being greater than the first quantity, to the plurality of interface channels.

16. The method of claim 15, wherein receiving the selection of the subset of catheter channels comprises receiving a user selection through a user interface.

17. The method of claim 15, wherein receiving the selection of the subset of catheter channels comprises receiving indications, from a contact sensing system, of which electrodes of the multi-electrode ablation catheter are in contact with tissue.

18. The method of claim 15, wherein receiving the selection of the subset of catheter channels comprises receiving indications, from an electrogram system, of which electrodes of the multi-electrode ablation catheter are producing an electrogram amplitude above a predetermined threshold.

19. The method of claim 15, wherein receiving the selection of the subset of catheter channels comprises receiving identification of at least one zone of the multi-electrode ablation catheter.

20. The method of claim 19, wherein mapping the subset of catheter channels comprises gaining access to a look-up table based on the identification of the at least one zone to determine the mapping.

* * * * *